United States Patent [19]
Van Daele et al.

[11] Patent Number: 5,600,629
[45] Date of Patent: Feb. 4, 1997

[54] INTER-SATELLITE METHOD FOR ROUTING PACKETS

[75] Inventors: Gerry Van Daele, Phoenix; Kenneth W. Hines, Tempe; Bradley T. Sanders, Chandler; Donald J. Sabourin, Mesa, all of Ariz.

[73] Assignee: Motorola, Inc., Schaumburg, Ill.

[21] Appl. No.: 524,955

[22] Filed: Sep. 8, 1995

Related U.S. Application Data

[63] Continuation of Ser. No. 279,729, Jul. 25, 1994, abandoned.

[51] Int. Cl.⁶ .................................................. H04J 3/26
[52] U.S. Cl. ........................ 370/349; 370/316; 370/389
[58] Field of Search .............................. 370/13, 14, 16, 370/54, 58.1, 58.2, 58.3, 60, 60.1, 61, 85.3, 85.13, 94.1, 94.3, 104.1; 340/825.03, 826, 827, 825.5, 825.51, 825.52; 379/268, 269, 271, 272, 273; 371/48, 67.1

[56] References Cited

U.S. PATENT DOCUMENTS

| | | | |
|---|---|---|---|
| 4,740,954 | 4/1988 | Cotton et al. | 370/60 |
| 4,769,811 | 9/1988 | Eckberg, Jr. et al. | 370/60 |
| 4,875,208 | 10/1989 | Furuhashi et al. | 370/94.1 |
| 4,939,725 | 7/1990 | Matsuda et al. | 370/85.3 |
| 4,939,726 | 7/1990 | Flammer et al. | 370/94.1 |
| 5,105,424 | 4/1992 | Flaig et al. | 370/94.1 |
| 5,119,369 | 6/1992 | Tanabe et al. | 370/60 |
| 5,216,670 | 6/1993 | Ofek et al. | 370/94.1 |
| 5,229,992 | 7/1993 | Jurkevich et al. | 370/82 |

*Primary Examiner*—Alpus H. Hsu
*Attorney, Agent, or Firm*—Harold C. McGurk

[57] ABSTRACT

A method routes data packets between nodes in a satellite-based communication system based on header information contained in each of the packets. The header information which contains routing and overhead information indicates whether the packet header has been received without any errors and whether the payload is to be read and processed by the node currently servicing the packet or passed on to another adjacent node. This method works in systems that have packet delays or transmission impairments, such as satellite-based telecommunication systems.

12 Claims, 4 Drawing Sheets

INTER-SATELLITE METHOD FOR ROUTING PACKETS

This application is a continuation of prior application Ser. No. 08/279,729 filed Jul. 25, 1994, now abandoned.

TECHNICAL FIELD

This invention relates generally to communication systems and, in particular, to a method for transmitting and receiving packets through a constellation of nodes or satellites.

BACKGROUND OF THE INVENTION

Conventional methods or protocols, such as the Asynchronous Transport Mode (ATM) protocol, are used for transporting packets of data from an origination node to a destination node. The ATM protocol and other conventional protocols are designed for ground-based telecommunication systems and cannot be used without modification in satellite-based systems due to the possibility of packets being reordered and the large jitter possible in the satellite network. Ground-to-space and space-to-space communication links place added constraints, such as packet delays and transmission impairments on their operation that existing, conventional protocols cannot handle. Thus, there is a need for a reliable method for routing data packets in a satellite-based communication system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

The present invention has utility in simplifying the routing between nodes in a satellite-based communication system while maintaining the high speed and efficient multiplexing and routing of diverse data structures by multiple satellites. Data structures supported include digitized voice and user data, bursty signaling and command data and satellite telemetry data. The method of the present invention optimizes packet routing through a constellation of satellites.

A "satellite" means a man-made object or vehicle intended to orbit a celestial body such as the earth. The term "satellite" is intended to include both geostationary and orbiting satellites and/or combinations thereof including low-earth orbiting (LEO) satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular communication systems and/or combinations thereof.

Figure 1:
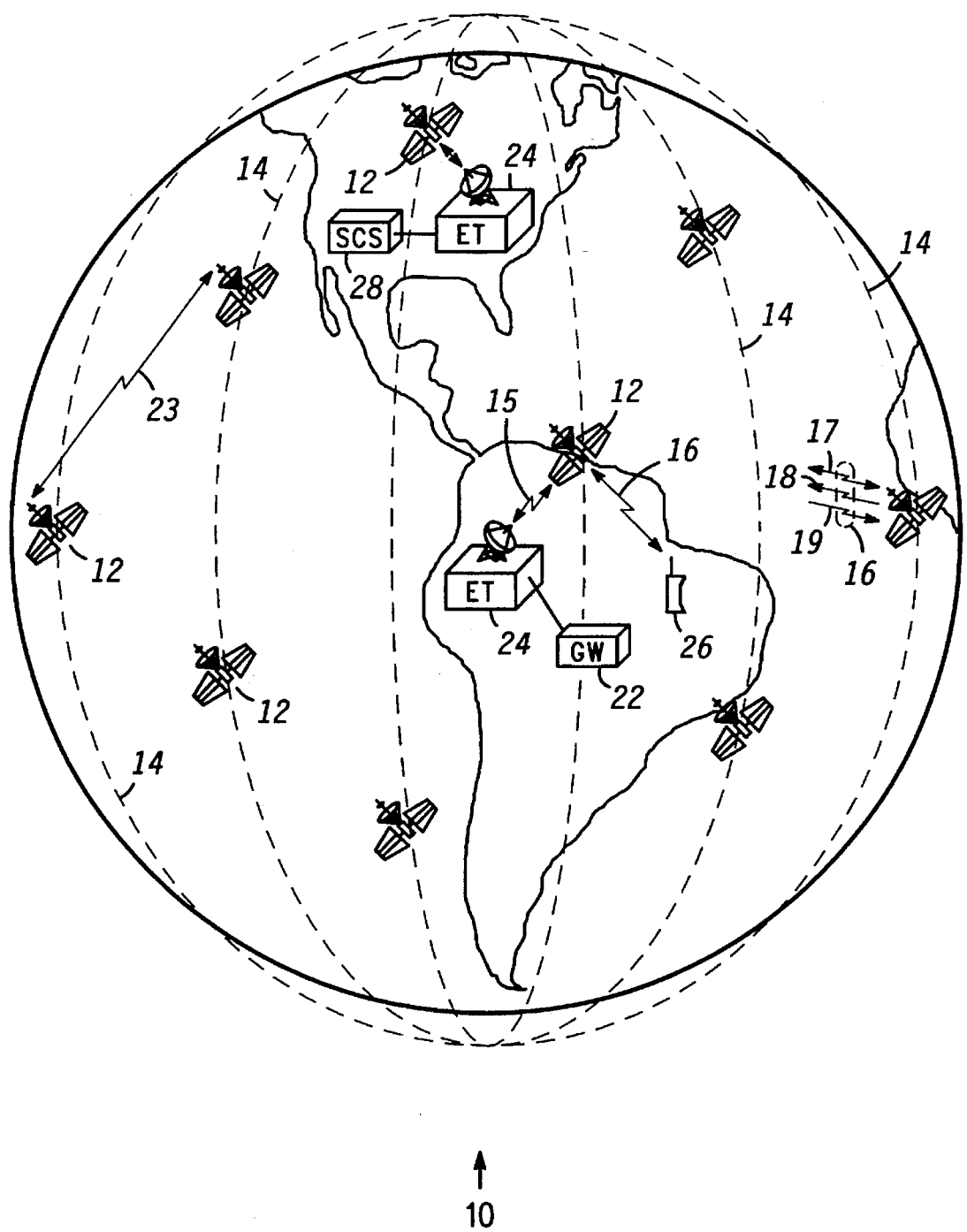
FIG. 1 depicts a highly simplified diagram of a satellite-based communication system of which the present invention may form a portion thereof.

FIG. 1 illustrates a highly simplified diagram of satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of the satellites 12 of the constellation.

For example, each orbit 14 encircles earth at an altitude of around 380 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or individual subscriber units (ISU's) 26 for a period of approximately nine minutes.

Satellites 12 communicate with terrestrial stations which may include some number of radio communication ISU's 26 and earth terminals (ET's) 24 connected to system control segment (SCS) 28. ET's 24 may also be connected to gateways (GW's) 22 which provide access to a public switched telephone network (PSTN) or other communications facilities. Only one each of GW's 22, SCS's 28 and ISU's 26 are shown in FIG. 1 for clarity and ease of understanding. ET's 24 may be co-located with or separate from SCS 28 or GW 22. ET's 24 associated with SCS's 28 relay packets related to operation of communication system 10, while ET's 4 associated with GW's 22 relay packets related to calls in progress.

ISU's 26 may be located anywhere on the surface of the earth or in the atmosphere above the earth. ISU's 26 are preferably communications devices capable of transmitting data to and receiving data from satellites 12. By way of example, ISU's 26 may be a hand-held, portable cellular telephones adapted to communicate with satellites 12. Ordinarily, ISU's 26 need not perform any control functions for communication system 10.

Communication system 10 may accommodate any number, potentially in the millions, of ISU's 26. In the preferred embodiments of the present invention, ISU's 26 communicate with nearby satellites 12 via subscriber links 16. Subscriber links 16 encompass a limited portion of the electromagnetic spectrum that is divided into numerous channels. Subscriber links 16 are preferably combinations of L-Band frequency channels and may encompass Frequency Division Multiple Access (FDMA) and/or Time Division Multiple Access (TDMA) and/or Code Division Multiple Access (CDMA) communications or combination thereof. At a minimum, satellite 12 regularly transmits over one or more broadcast channels 18. ISU's 26 synchronize to broadcast channels 18 and monitor broadcast channels 18 to detect data messages which may be addressed to them. ISU's 26 may transmit messages to satellites 12 over one or more acquisition channels 19. Broadcast channels 18 and acquisition channels 19 are not dedicated to any one ISU 26 but are shared by all ISU's 26 currently within view of a satellite 12.

On the other hand, traffic channels 17 are two-way channels that are assigned to particular ISU's 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the earth may be routed through the constellation of satellites 12 to within range of substantially any other point on the surface of the earth. A communication may be routed down to an ISU 26 on or near the surface of the earth from a satellite 12 using subscriber link 16. Alternatively, a communication may be routed down to or up from any of many ET's 24, of which FIG. 1 shows only two, through earth links 15. ET's 24 are usually distributed over the surface of the earth in accordance with geo-political boundaries. In the preferred embodiments, each satellite 12 may communicate with up to four ET's 24 and over a thousand ISU's 26 at any given instant.

SCS 28 monitors the health and status of system communication nodes (e.g., GW's 22, ET's 24 and satellites 12) and desirably manages operations of communication system 10. One or more ET's 24 provide the primary communications interface between SCS 28 and satellites 12. ET's 24 include antennas and RF transceivers and provide primary K-band links to the constellation. SCS 28 preferably performs telemetry, tracking and control functions for the constellation of satellites 12.

GW's 22 may perform call processing functions in conjunction with satellites 12. Diverse terrestrial-based communication systems, such as the PSTN, may access communication system 10 through GW's 22.

With the example constellation of sixty-six satellites 12, each point on the earth's surface is within view of at least one of the satellites 12 at all times, resulting in full coverage of the earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISU's 26, between SCS 28 and GW 22, between any two GW's 22 or between ISU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTN's and/or conventional terrestrial cellular telephone devices coupled to the PSTN through conventional terrestrial base stations.

Figure 2:
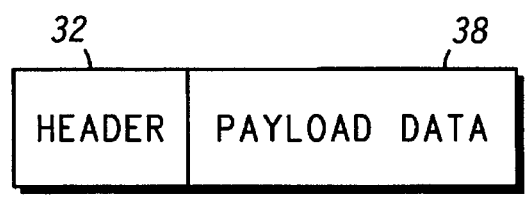
FIG. 2 shows a block diagram of a packet in accordance with a preferred embodiment of the present invention.

FIG. 2 shows a block diagram of an exemplary data packet 30 that may be used to transport calls or communications to or from subscriber units 26 in accordance with a preferred embodiment of the present invention. Packet 30 includes header 32 and payload 38.

Header 32 represents routing and overhead data which serves to get data packet 30 to its destination node. Header 32 can be effectively used in routing packets through the network. At the packet's destination, payload data 38 are processed. In other words, the purpose of sending packet 30 to a destination is typically to deliver payload data 38 and not only the information associated with header 32.

Payload data 38 includes either system control data, network operational data, mission control data (MCD) or mission data. System control data and network operational data are commands, telemetry or messages which are interpreted and acted upon by satellites 12 or SCS 28. Mission control data is routed to and processed by satellites 12, GW's 22 or ISU's 26. Mission data represent subscriber data transported to either GW's 22 or ISU's 26 in the course of a call. As discussed above, a digitized version of an entire frame of conversational audio may be conveyed by mission data as might a portion of subscriber provided data traffic such as might be provided by an output from a computer or properly interconnected modem.

Figure 3:
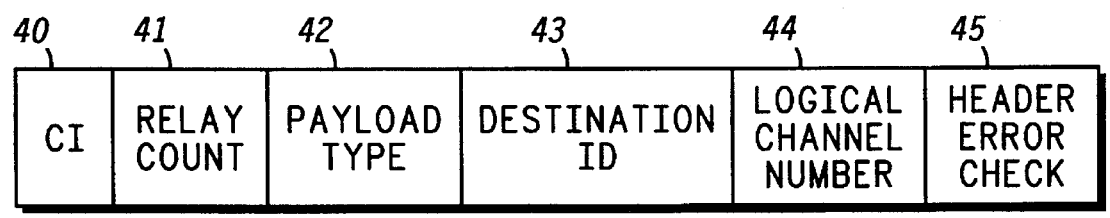
FIG. 3 shows a header of a packet in accordance with a preferred embodiment of the present invention.

FIG. 3 shows fields of packet header 32 in accordance with a preferred embodiment of the present invention. Packet header 32 is 40-bits in length and contains the protocol control information for passing packets between nodes (e.g., satellites, gateways, ISU's). Packet header 32 comprises congestion indicator "CI") 40, relay count 41, payload type 42, destination ID 43, logical channel number 44 and header error check 45.

Congestion indicator 40 can be set by any of the satellites 12 along the call path to notify the end user that congestion exists on the path and that service might be improved by lowering the bandwidth demands.

Relay count 41 is four bits long. A relay count is initialized to a certain predetermined value at the source node and adjusted (decremented or incremented) at selected intermediate nodes. When relay count 41 equals a predetermined value, such as zero for example, the data packet is discarded. Relay count 41 prevents packets from remaining indefinitely in the nodal network and needlessly using vital resources. Relay count 41 may be selectively adjusted based on a satellite's position in the constellation so that it is not adjusted too quickly and the data packet is discarded before it could ever reach the destination node. Whether relay count 41 is decremented or incremented and compared to a predetermined number (such as zero) is unimportant for purposes of this invention.

Payload type 42 is three bits long and identifies the type of data being carried in the payload field to the destination node. Payload type or type characterization may indicate whether packet 30 conveys system control data, network operational data, mission control data or mission data. Payload type 42 permits efficient routing at the destination, particularly if the data is destined for an ISU on the subscriber links.

Destination ID 43 is eight bits long and indicates a null packet, an end-of-burst packet, the destination satellite or the destination ET that is to receive the data packet. Destination ID 43 is utilized by the routing method at intermediate and destination satellite nodes to route the packet through the constellation of nodes. Destination ID 43 may be all zeroes, that indicates a null packet, or may be all ones indicating an end-of-burst packet.

Logical channel number 44 differentiates between various calls within a gateway or within the originating or terminating satellite. Logical channel number 44 may be used to map a packet to the assigned traffic channel 17 of the link between the satellite and the ISU 26. Logical channel number 44 may also be included in other portions of packet 30. Logical channel number 44 may include a destination satellite number or other designator for the destination of the packet. Logical channel number 44 is desirably assigned within the system and known by all satellites 12 and ET's 24 participating in the process of connection establishment.

Logical channel number 44 is sixteen bits long. The logical channel numbers for a given call, up to four per call, are assigned by satellite 12 and/or ET 24 at the end of the call it services. When a satellite at the end of the call changes because of a satellite-to-satellite handoff, the new end satellite assigns a new logical channel number to the end of the call it is servicing.

Header error check 45 uses the error detection and correction as defined for the ATM protocol. The preferred method of error checking is to use the modified Hamming Code Single Bit error correction which is known to those of ordinary skill in the art.

The bit-size of the fields, the type of error checking being performed and the ordering of the fields in the packet header 32 are not important for the present invention. In other words, those skilled in the art may increase or decrease the size of the fields or may use alternative methods for error detection and correction than those described above.

Figure 4:
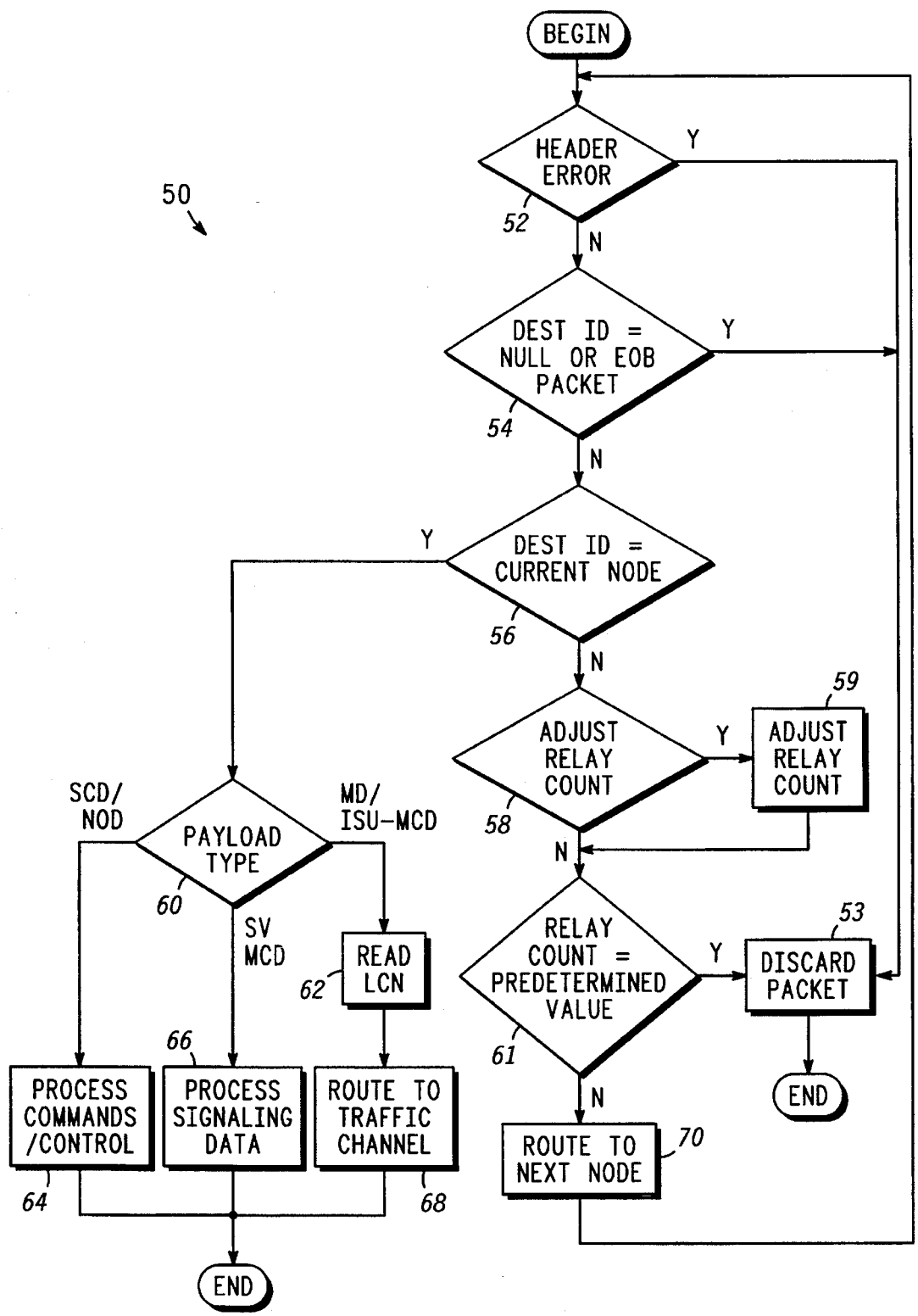
FIG. 4 shows a flowchart of a method applicable to a satellite or other relay node for routing data packets between a number of nodes in accordance with a preferred embodiment of the present invention.

FIG. 4 shows a flowchart of a method 50 applicable to a satellite or other relay node for routing data packets between a number of nodes in accordance with a preferred embodiment of the present invention. As shown in FIG. 4, method 50 begins by checking in step 52 for any errors in the header. In step 52, method 50 evaluates the header error check 45 to determine if the calculated and the specified checksum agree. There are many ways of calculating a checksum which are known to those of ordinary skill in the art. Which method is chosen to calculate the checksum or for determining whether any errors in the header exist is unimportant for the present invention.

If packet header 32 is invalid because an uncorrectable error was found in step 52, packet 30 is discarded in step 53 as shown in FIG. 4 and method 50 terminates. If packet header 32 is valid as determined in step 52, method 50 checks in step 54 the destination ID 43 to determine if the packet is either a null packet or an end-of-burst packet. A null packet is used to synchronize the transmission link prior to sending data or to maintain synchronization where no packets are available for transmission. The end-of-burst packet is used to signify the end of the burst transmission from the transmitting node. If the packet is either a null packet or an end-of-burst packet, it is discarded in step 53 and the process ends. Otherwise, method 50 compares in step 56 the destination ID 43 to the current node ID of the node reading the packet header. The destination ID 43, as explained above, indicates whether the packet is destined for this particular node currently reading the header information.

If method 50 determines from the destination ID 43 that the packet is not destined for this particular node which is currently reading the header information, method 50 based on uploaded system parameters from the System Control Segment determines in step 58 whether relay count 41 should be adjusted (decremented or incremented). If relay count 41 is to be adjusted as determined from the uploaded system parameters, relay count 41 is adjusted (decremented or incremented) in step 59. Method 50 then compares in step 61 relay count 41 to a predetermined value, such as zero. If the relay count 41 is equal to the predetermined number, method 50 discards the data packet in step 53 and terminates. If the relay count 41 not equal to the predetermined value, method 50 determines in step 70 where to send the packet.

Method 50 using a routing cue table routes in step 70 the data packet to the next designated node. The routing cue table indicates which adjacent node to route the data packet. The routing cue table is created, maintained and updated by the SCS during periodic intervals or when an emergency situation arises. The data packet is transmitted to the next designated node.

According to FIG. 4, if the node currently reading the header information is the node which is to receive the data packet, method 50 in step 60 reads the payload type 42 to determine what the actual destination is. If payload type 42 indicates that the packet contains mission data or ISU mission control data, method 50 reads in step 62 logical channel number 44 to determine where to send it. Mission data comprises voice and data such as facsimile and email. As stated above, the logical channel number is assigned to the destination ISU by the destination node during call setup or satellite-to-satellite handoff. Thus, the packet's payload is destined for an individual subscriber unit and is transmitted or routed in step 68 to a traffic channel 17.

If payload type 42 indicates SV (satellite or space vehicle) mission control data, it is processed in step 66 by the servicing node's computer. Mission control data is data used to set up and manage a call. If payload type 42 indicates system control data or network operational data, it is processed in step 64 by the servicing node's computer. System control data comprises data that is used to control satellite 12 in its role as a space vehicle, while network operational data comprises data that is used to manage the communications resources on board the satellite 12.

Figure 5:
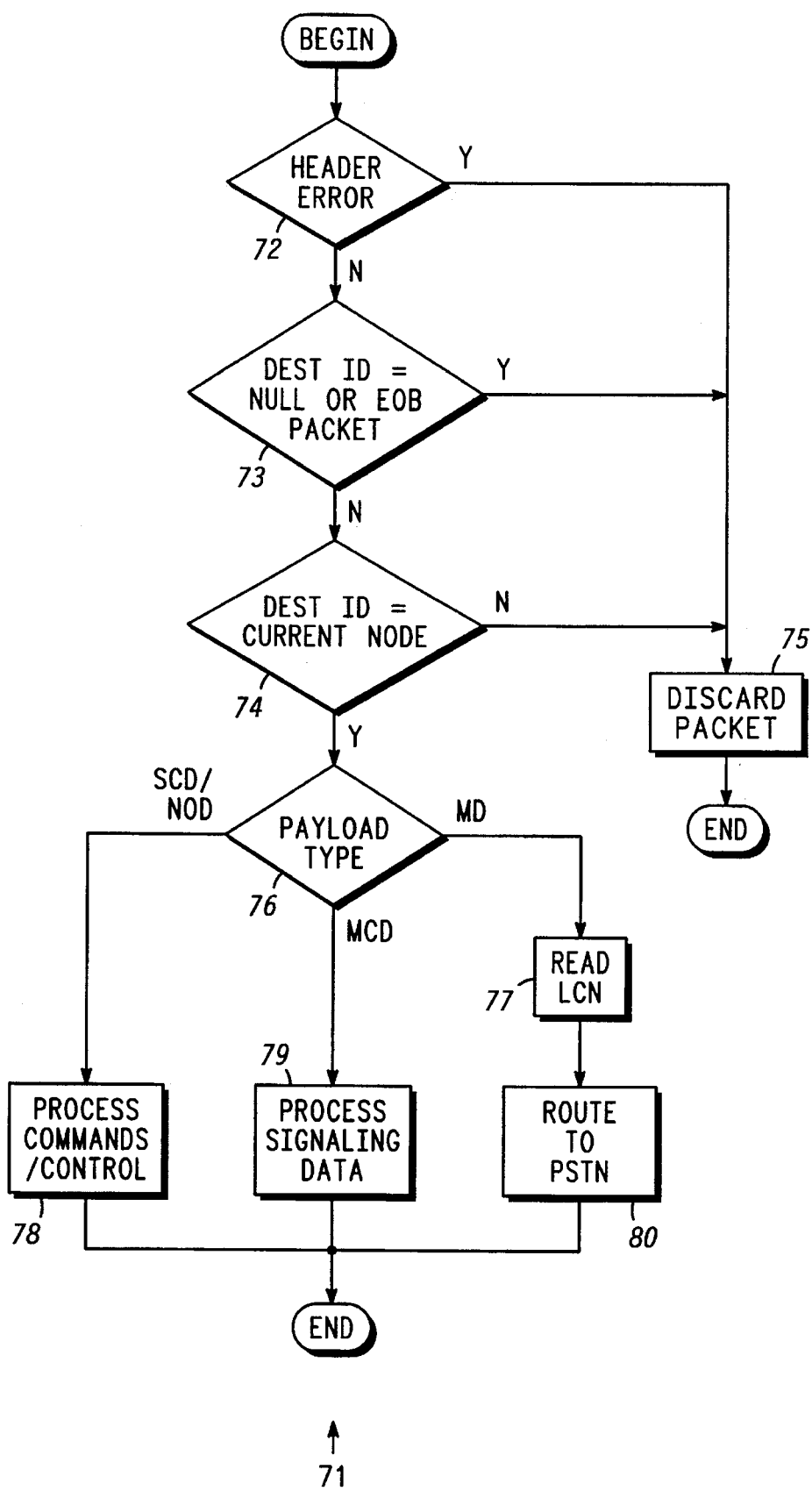
FIG. 5 shows a flowchart of a method applicable to an earth terminal operating as an end node for routing data packets between a number of nodes in accordance with a preferred embodiment of the present invention.

FIG. 5 shows a flowchart of a method 71 applicable to an earth terminal (ET) operating as an end node for routing data packets between a number of nodes in accordance with a preferred embodiment of the present invention. As shown in FIG. 5, method 71 begins by checking in step 72 for any errors in the header. In step 72, method 71 evaluates the header error check 45 to determine if the calculated and the specified checksum agree. There are many ways of calculating a checksum which are known to those of ordinary skill in the art. Which method is chosen to calculate the checksum or for determining whether any errors in the header exist is unimportant for the present invention.

If packet header 32 is invalid because an uncorrectable error was found in step 72, packet 30 is discarded in step 75 as shown in FIG. 5 and the method ends. If packet header 32 is valid as determined in step 72, method 71 checks in step 73 the destination ID 43 to determine if the packet is either a null packet or an end-of-burst packet. The functions of the null packet and the end-of-burst packet are described above. If the packet is either a null packet or an end-of-burst packet, it is discarded in step 75 and the process ends.

Otherwise, method 71 reads in step 74 the destination ID 43. The destination ID 43, as explained above, indicates whether the packet is destined for this particular node currently reading the header information. If method 71 determines from the destination ID 43 that the packet is not destined for this current node which is presently reading the header information and which is an end node, method 71 discards the packet in step 75 and the process ends.

According to FIG. 5, if the node currently reading the header information is the node which is to receive the data packet, method 71 in step 76 reads the payload type 42 to determine what the actual destination is. If payload type 42 indicates that the packet contains mission data, method 71 reads in step 77 logical channel number 44 to determine where to send it. Mission data comprises voice and data such as facsimile and email. As stated above, the logical channel number is assigned to the destination ISU or gateway user by the destination node during call setup or satellite-to-satellite handoff. Thus, in method 71, the packet's payload is destined for an individual PSTN user and is routed in step 80 to the PSTN user accessing the communication system 10 through a GW 22.

If payload type 42 indicates mission control data, it is processed as signaling data in step 79 by the servicing node's computer. Mission control data is data used to set up and manage a call. If payload type 42 indicates system control data or network operational data, it is processed in step 78 by the servicing node's computer. System control data and network operational data comprises data that is used to control and manage the system resources of the GW 22.

It will be appreciated by those skilled in the art that the present invention allows for high-speed routing of packets between end-to-end nodes via the many nodes of the constellation. The present invention provides the capability of fast packet routing through the satellite constellation. Maximum transfer rates with reduced power, are extremely important for satellite operations, and are achieved in method 50 by routing data packets at the lowest layer (physical).

Accordingly, it is intended by the appended claims to cover all modifications of the invention which fall within the true spirit and scope of the invention.

What is claimed is:

1. A method executed by each of a plurality of nodes for routing a packet from an origination node to a destination node through the nodes, the nodes being connected together, the packet including a header, the header including a destination ID, each of the nodes storing a routing cue table, the method comprising the steps of:

(a) checking for errors in the header to determine whether the header is valid;

(b) discarding the packet if the destination ID indicates a null packet or an end-of-burst packet;

(c) forwarding the packet from a current node to a next adjacent node according to the destination ID and the routing cue table if the packet is not destined for the current node and the header of the packet is valid as determined in step (a) and the packet is not discarded in step (b); and (d) repeating steps (a), (b) and (c) until the packet arrives at the destination node or the packet is discarded in step (b).

2. A method as recited in claim 1, wherein step (a) comprises the step of discarding the packet if the header is invalid.

3. A method as recited in claim 2, wherein the header includes a relay count, and wherein step (b) comprises the steps of:

(b1) decrementing the relay count;

(b2) comparing the relay count to a predetermined value; and (b3) discarding the packet if the relay count is equal to the predetermined value.

4. A method as recited in claim 2, wherein the header includes a relay count, and wherein step (b) comprises the steps of:

(b1) incrementing the relay count;

(b2) comparing the relay count to a predetermined value; and (b3) discarding the packet if the relay count is equal to the predetermined value.

5. A method as recited in claim 2, wherein step (b) comprises the steps of:

(b1) discarding the packet if the destination ID indicates a null packet or an end-of-burst packet; and (b2) determining whether the destination ID matches a current node ID of the node reading the header.

6. A method as recited in claim 2, wherein step (b) comprises the steps of:

(b1) reading the destination ID included in the packet;

(b2) determining whether the current node matches the destination ID;

(b3) identifying from the routing cue table which adjacent node to send the packet to based on the destination ID and if the current node does not match the destination ID; and (b4) forwarding the packet to the next adjacent node identified in step (b3).

7. A method as recited in claim 2, wherein the header includes a logical channel number, and wherein step (b) comprises the steps of:

(b1) reading the logical channel number to identify which traffic channel is connected to the destination ID; and (b2) forwarding the packet to the traffic channel identified by the logical channel number.

8. A method as recited in claim 1, wherein the packet includes header error check information, and wherein step (a) comprises the steps of:

(a1) determining whether the header of the packet has an uncorrectable error based on the header error check information; and (a2) discarding the packet if there is an uncorrectable header error found in step (a1).

9. A method executed by each of a plurality of nodes for routing packets from an origination node to a destination node through the nodes, the nodes being connected together, each of the packets including a header, each of the nodes storing a routing cue table, the method comprising the steps of:

(a) checking for errors in the header to determine whether the header is valid;

(b) reading a destination ID included in the packet;

(c) discarding the packet if the header is invalid as found in step (a) or the destination ID indicates a null packet or an end-of-burst packet;

(d) determining whether a current node matches the destination ID if the packet was not discarded in step (C), the current node being the node reading the header;

(e) identifying from the routing cue table which adjacent node to send the packet to based on the destination ID and if the current node does not match the destination ID and the packet was not discarded in step (c);

(f) forwarding the packet to the adjacent node identified in step (e) if the packet was not discarded in step (c); and (g) repeating steps (a)–(f) until the packet arrives at the destination node or the packet is discarded in step (c).

10. A method executed by each of a plurality of nodes for routing packets from an origination node to a destination node through the nodes, the nodes being connected together, each of the packets including a header and a payload, each of the headers including a relay count, payload type, header error check and destination ID, each of the nodes storing a routing cue table, the method comprising the steps of:

(a) discarding the packet if the header error check is not equal to a calculated error check of the header;

(b) discarding the packet if the destination ID indicates a null packet or an end-of-burst packet;

(c) determining whether a current node matches the destination ID if the packet is neither the null packet nor the end-of-burst packet;

(d) reading the payload type to determine where the packet is to be routed if the current node matches the destination ID;

(e) identifying from the routing cue table which node to send the packet to based on the destination ID if the current node does not match the destination ID;

(f) adjusting the relay count;

(g) discarding the packet if the relay count is equal to a predetermined value;

(h) forwarding the packet if the packet is not discarded in (g) to the node identified in step (e); and (i) repeating steps (a)–(h) until the packet arrives at the destination node.

11. A method executed by each of a plurality of satellites for routing a packet from an origination satellite to a destination satellite through the satellites, the packet including a header, the header including a destination ID, each of the satellites storing a routing cue table, the method comprising the steps of:

(a) checking for errors in the header to determine whether the header is valid;

(b) discarding the packet if the header is invalid, or the destination ID indicates a null packet or an end-of-burst packet;

(c) forwarding the packet from a current satellite to a next adjacent satellite according to the destination ID and the routing cue table if the packet is not destined for the current satellite and the packet is not discarded in step (b); and (d) repeating steps (a), (b) and (c) until the packet arrives at the destination satellite or the packet is discarded in step (b).

12. A method executed by each of a plurality of nodes for routing groups of packets from an origination node to a destination node through the nodes, each of a number of packets in a group of packets including a header, the header including a destination ID, each of the nodes storing a routing cue table, the method comprising the steps of:

(a) receiving a group of packets in a burst transmission;

(b) checking for errors in the header of each packet in the group to determine whether the header is valid;

(c) discarding any of the packets if the header is invalid, or the destination ID indicates a null packet or an end-of-burst packet;

(d) burst transmitting the group of packets from a current node to a next adjacent node according to the destination ID and the routing cue table, if the packet is not destined for the current node, the packet is not discarded in step (c) and the packet is going to a same next adjacent node; and (e) repeating steps (a) through (d) until the group of packets arrive at the destination node or a packet in the group of packets is discarded in step (c).

* * * * *